United States Patent Office 2,990,401
Patented June 27, 1961

2,990,401
11-SUBSTITUTED 16α,17α-SUBSTITUTED METHYLENEDIOXY STEROIDS

Seymour Bernstein, Pearl River, N.Y., and George R. Allen, Jr., Paramus, N.J., assignors to American Cyanamid Company, New York, N.Y., a corporation of Maine
No Drawing. Filed June 18, 1958, Ser. No. 742,742
2 Claims. (Cl. 260—239.55)

This invention relates to new steroid compounds. More particularly, it relates to 16α,17α-substituted methylenedioxy steroids of the pregnane series.

It has been shown in the past that 16α,17α-isopropylidene pregnanes can be prepared from the corresponding 16α,17α-dihydroxy pregnane [Journal of the Chemical Society, 4373 (1955)].

The present invention is a continuation-in-part of our copending application, Serial No. 720,564, filed March 11, 1958.

We have now found that substituted methylenedioxy steroids having the following general formula have high anti-inflammatory activity:

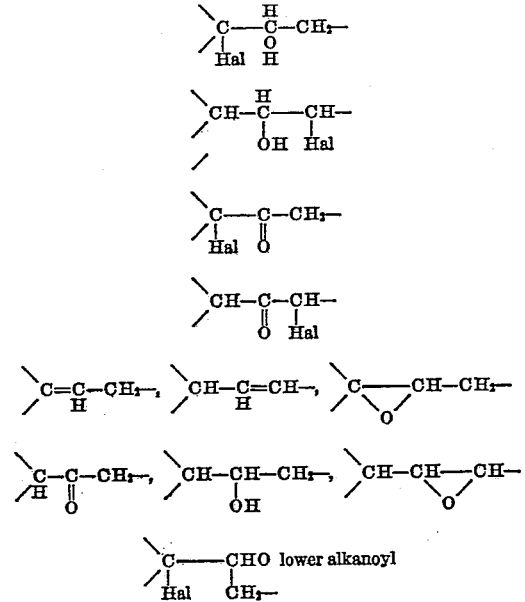

wherein $>C_c-C_d-C_e-$ is a trivalent substituted three carbon chain of the group consisting of

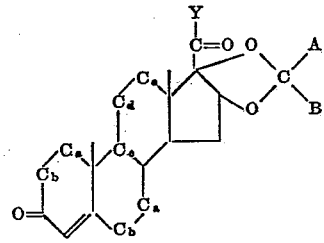

A and B are hydrogen or lower alkyl radicals; $C_a-C_b$ is a divalent radical of the group consisting of $-CH_2CH_2-$; $-CH=CH-$;

$$-CH_2-CHCH_3; -CH=C-CH_3$$

and Y is a monovalent radical of the group consisting of $-CH_3$; $-CH_2OH$;

$$-CH_2O\underset{\underset{O}{\|}}{C} \text{ lower alkyl}$$

The compounds of the present invention are, in general, crystalline solids and insoluble in water. They are crystallizable from organic solvents such as toluene, benzene, petroleum ether and the like or mixtures or organic solvents such as benzene-toluene, acetone-petroleum ether or acetone-benzene.

The compounds of the present invention are prepared by reacting a vicinal cis dihydroxy steroid having the following structure:

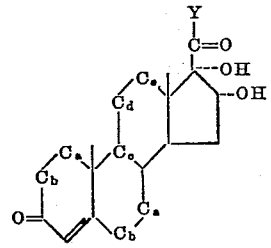

in which $>C_c-C_d-C_e-$, $C_a-C_b$ and Y are as defined above with a ketone or aldehyde such as acetone, acetaldehyde, ethyl methyl ketone, ethyl amyl ketone, propionaldehyde, diethyl ketone and the like. The reaction is preferably carried out by adding the steroid to the ketone or aldehyde and allowing the reaction to take place in the presence of a mineral acid. The reaction is usually carried out at a temperature within the range of from about 15° to 60°. It is usually complete within a period of from about one hour to eighteen hours.

After the formation of the 16α,17α-methylenedioxy ring on the steroid nucleus, other transformations can be made, such as conversion of the 21-hydroxymethylene group into a lower alkanoyloxymethylene group by reaction with a lower alkanoic acid anhydride or chloride. Among the suitable reagents can be mentioned acetic anhydride, propionic anhydride, butyric anhydride, acetyl chloride, propionyl chloride and the like.

The starting steroids utilizable in the process of the present invention can be, for example:
16α,17α-dihydroxy-4,9(11)-pregnadiene-3,20-dione;
9α-bromo-11β,16α,17α-trihydroxy-4-pregnene-3,20-dione;
9α-fluoro-11β,16α,17α-trihydroxy-4-pregnene-3,20-dione;
9α-chloro-11β,16α,17α-trihydroxy-4-pregnene-3,20-dione;
9β,11β-epoxy-16α,17α-dihydroxy-4-pregnene-3,20-dione;
11β,16α,17α,21-tetrahydroxy-4-pregnene-3,20-dione;
9α - fluoro - 11β,16α,17α,21 - tetrahydroxy - 4 - pregnene-3,20-dione;
11β,16α,17α,21-tetrahydroxy-1,4-pregnadiene-3,20-dione;
16α,17α,21-trihydroxy-1,4-pregnadiene-3,11,20-trione;
9α - fluoro - 11β,16α,17α,21 - tetrahydroxy - 1,4 - pregnadiene-3,20-dione;
9α - fluoro - 11β,16α,17α,21 - tetrahydroxy - 4,6 - pregnadiene-3,20-dione;
9α - fluoro - 11β,16α,17α,21 - tetrahydroxy - 1,4,6 - pregnatriene-3,20-dione;
11β - acetoxy - 9α - fluoro - 16α,17α,21 - trihydroxy - 1,4-pregnadiene-3,20-dione;
11β,16α,17α,21 - tetrahydroxy - 6α - methyl - 4 - pregnene-3,20-dione;
11β,16α,17α,21 - tetrahydroxy - 6α - methyl - 1,4 - pregnadiene-3,20-dione;
9α - fluoro - 11β,16α,17α,21 - tetrahydroxy - 6α - methyl-1,4-pregnadiene-3,20-dione;
9α - chloro - 11β,16α,17α,21 - tetrahydroxy - 1,4 - pregnadiene-3,20-dione;
9α - chloro - 11β,16α,17α,21 - tetrahydroxy - 4 - pregnene-3,20-dione;
12α - chloro - 11β,16α,17α,21 - tetrahydroxy - 4 - pregnene-3,20-dione;
12α - fluoro - 11β,16α,17α,21 - tetrahydroxy - 4 - pregnene-3,20-dione;

12α - bromo - 11β,16α,17α,21 - tetrahydroxy - 4 - pregnene-3,20-dione;

12α - chloro - 16α,17α,21 - trihydroxy - 1,4 - pregnadiene-3,20-dione;

12α - fluoro - 16α,17α,21 - trihydroxy - 1,4 - pregnadiene-3,20-dione;

12α - bromo - 16α,17α,21 - trihydroxy - 1,4 - pregnadiene-3,20-dione;

9α - fluoro - 11β,16α,17α,21 - tetrahydroxy - 2 - methyl - 4 - pregnene-3,20-dione;

11β,16α,17α,21 - tetrahydroxy - 2 methyl - 4 - pregnene-3,20-dione and the like.

The particularly preferred steroids as starting material are those wherein the $C_a$—$C_b$ (1,2-position) is either saturated or double-bonded, $>C_c$—$C_d$—$C_e$—is

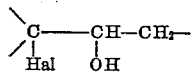

or

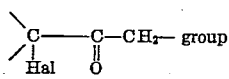 group $C_a$—$C_b$ (6,7-position) is saturated and Y is methyl or hydroxymethyl.

The compounds of the present invention are physiologically active possessing glucocorticoid and anti-inflammatory activity. They can be used systemically and topically in the treatment of rheumatoid arthritis, burns, allergies, psoriasis and other skin disorders.

In the present application, the term lower alkanoyl is intended to cover derivatives of alkanoic acids having 1-6 carbon atoms. The term halogen covers bromine, chlorine, iodine and fluorine. The temperatures are on the centigrade scale unless otherwise indicated.

The following examples describe the present invention in greater particularity and are intended to be by way of illustration and not limitation.

EXAMPLE 1

*Preparation of 9α-bromo-11β-hydroxy-16α,17α-isopropylidenedioxy-4-pregnene-3,20-dione*

A solution of osmium tetroxide (10 g.) in benzene (200 ml.) is added dropwise (one drop per second), with stirring, to a solution of 4,9(11),16-pregnatriene-3,20-dione (11.6 g.) in benzene (340 ml.) and pyridine (6 ml.). When addition is complete, stirring is continued for one hour. Methanol (380 ml.) is added followed by a solution of sodium sulfite (54 g.) and potassium hydrogen carbonate (54 g.) in water (560 ml.). The mixture is stirred for three hours and then further for one-half hour after addition of chloroform (500 ml.). The organic layer is separated from the filtered reaction mixture and combined with the chloroform extracts (3×250 ml.) of the aqueous layer, the chloroform having been previously used in washing the filter cake. The combined chloroform is washed with water (500 ml.), dried over anhydrous magnesium sulfate, and removal of solvent gives a greenish-yellow solid which is washed with a little methanol and dried. The solid which is recovered weighs 11 grams and melts at 209–215°. A specimen of this material crystallizes as prisms, melting point 211–215° from chloroform-methanol. The same specimen melts at 215–22° after drying overnight at the temperature of boiling xylene.

One gram of the product of the foregoing reaction, 16α,17α-dihydroxy-4,9(11)-pregnadiene-3,20-dione, is dissolved in acetone (25 ml.). Hydrochloric acid (three drops; d 1.19) is added to the solution which is then boiled gently for two minutes. After the reaction mixture is kept at room temperature for eighteen hours, the product is separated by addition of water (75 ml.) followed by ether extraction (3×50 ml.), the combined extracts being washed with aqueous sodium hydrogen carbonate solution (50 ml.), water (50 ml.), and then dried over anhydrous sodium sulfate. The 16α,17α-isopropylidenedioxy derivative is recovered and melts at 200–201°.

The product of the foregoing paragraph, 16α,17α-isopropylidenedioxy - 4,9(11) - pregnadiene-3,20-dione (200 mg.), is dissolved in 5 ml. of peroxide-free dioxane and 1 ml. of water. The resulting solution is treated with 102 mg. of N-bromosuccinimide and 0.36 ml. of 10% perchloric acid. The product (115 mg.) crystallizes as needles melting at 185° (dec.) from benzene-petroleum ether.

EXAMPLE 2

*Preparation of 9α-bromo-11β-hydroxy-16α,17α-isopropylidenedioxy-4-pregnene-3,20-dione*

N-bromosuccinimide (143 mg.) is dissolved in a solution of 16α,17α-dihydroxy-4,9(11)-pregnadiene-3,20-dione (250 mg.) in peroxide-free dioxane (5 ml.) and water (1 ml.), and to this solution is added perchloric acid (0.5 ml.; 10%). The reaction mixture is kept at room temperature for fifteen minutes, excess hypobromous acid is destroyed by addition of a few drops of sodium sulphite solution, and the solid obtained by pouring the solution into water (25 ml.) and filtering is washed with a little methanol and then ether. This product (220 mg.), melting point 185° dec., is dissolved in acetone (50 ml.), concentrated hydrochloric acid (four drops; d 1.16) is added, and after boiling for two minutes, the solution is kept at room temperature for eighteen hours. The isopropylidene compound is isolated as before and crystallizes from benzene-petroleum ether as needles (120 mg.), melting point 185° (dec.), $[\alpha]_D^{25} +150°$ (chloroform); ultraviolet spectrum

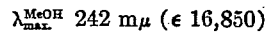

EXAMPLE 3

*Preparation of 9α-fluoro-11β-hydroxy-16α,17α-isopropylidenedioxy-4-pregnene-3,20-dione*

A mixture of 250 mg. of the product of Example 1, 9α - bromo - 11β-hydroxy-16α,17α-isopropylidenedioxy-4-pregnene-3,20-dione, 125 mg. of anhydrous potassium acetate and 25 ml. of ethanol is heated under reflux on a steam bath for eighteen hours. The solvent is removed by evaporation and 25 ml. of water is added to the residue. The resulting aqueous solution is extracted three times with 20 ml. each time of chloroform. The three chloroform extracts are combined and dried over anhydrous sodium sulfate. The dried solution is concentrated under reduced pressure, and the crude residual product is crystallized from benzene-petroleum ether solution to give the epoxide, 9β,11β - epoxy - 16α,17α - isopropylidenedioxy-4-pregnene-3,20-dione.

A solution is prepared of 3 g. of the product of the preceding paragraph, 9β,11β-epoxy-16α,17α-isopropylidenedioxy-4-pregnene-13,20-dione, in 1.5 ml. of methylene dichloride. Another solution is prepared by slowly adding with shaking 5 ml. of anhydrous hydrofluoric acid to 10.3 ml. of tetrahydrofuran and 3.64 ml. of methylene dichloride cooled to —60°. The second mixture is added to the first at —60°. The combination is kept at —60° for fifteen minutes and then at 0° for three hours. After that time, the reaction mixture is poured into iced sodium bicarbonate solution. The resulting aqueous mixture is extracted with chloroform. The chloroform extract is dried over anhydrous sodium sulfate, and the dried solution is concentrated to dryness under reduced pressure giving 0.3 g. of a gummy solid. This latter material is dissolved in benzene and chromatographed on 12 g. of silica gel. A solution of 25% ether in benzene elutes (with 19 mg. of starting material as a contaminant) 92 mg. of the fluorohydrin which crystallizes as needles melting at 243–247° (dec.) The analytical sample melts at 250.5–251.5° dec.; $[\alpha]_D^{25}+143°$ (chloroform; ultraviolet spectrum:

$$\lambda_{max.}^{MeOH} \ 238 \ m\mu \ (\epsilon \ 17,100)$$

EXAMPLE 4

*Preparation of 11β,21-dihydroxy-16α,17α-isopropylidenedioxy-4-pregnene-3,20-dione*

Perchloric acid (five drops; 70%) is added to a stirred suspension of 11β,16α,17α,21-tetrahydroxy-4-pregnene-3,20-dione (500 mg.) in acetone (50 ml.). Solution takes place rapidly, and the mixture is kept at room temperature for eighteen hours when it is diluted with water (200 ml.). The solid which separates is extracted in chloroform (3×50 ml.), and the combined extracts are washed with water (50 ml.) and dried over anhydrous sodium sulfate. Evaporation of solvent followed by crystallization of the residue from ethyl acetate-petroleum ether gives 11β,21-dihydroxy-16α,17α-isopropylidenedioxy-4-pregnene-3,20-dione as needles (300 mg.), melting point 203–206°; $[\alpha]_D^{25}+152°$ (methanol); ultraviolet spectrum:

$$\lambda_{max.}^{MeOH} \ 240 \ m\mu \ (\epsilon \ 16,100)$$

EXAMPLE 5

*Preparation of 9α-fluoro-11β,21-dihydroxy-16α,17α-isopropylidenedioxy-4-pregnene-3,20-dione*

A solution of 9α-fluoro-11β,16α,17α,21-tetrahydroxy-4-pregnene-3,20-dione (200 mg.) in 50 ml. of hot acetone is treated with five drops of concentrated hydrochloric acid and boiled for three minutes. After standing at room temperature for seventeen hours, the reaction mixture is poured into dilute sodium bicarbonate and extracted with ethyl acetate. The extract is washed with saturated saline solution, dried and evaporated to a colorless glass. Crystallization of the residue from acetone-petroleum ether gives 152 mg. of product, melting point 261.5–262.5° dec. [with previous softening and browning]. Recrystallization from acetone-petroleum ether gives 145 mg. of pure 9α-fluoro-11β,21-dihydroxy-16α,17α-isopropylidenedioxy-4-pregnene-3,20 - dione, melting point 262° (dec.) [with previous softening and browning]; $[\alpha]_D^{25}+144°$ (chloroform); ultraviolet spectrum:

$$\lambda_{max.}^{Abs. \ Alc.} \ 238–239 \ m\mu \ (\epsilon \ 16,100)$$

EXAMPLE 6

*Preparation of 9α-bromo-11β-hydroxy-16α,17α-isopropylidenedioxy-1,4-pregnadiene-3,20-dione*

A solution of osmium tetroxide (10 g.) in benzene (200 ml.) is added dropwise (one drop per second) with stirring to a solution of 4,9(11),16-pregnatriene-3,20-dione (11.6 g.) in benzene (340 ml.) and pyridine (6 ml.). After addition, stirring is continued for one hour. Methanol (380 ml.) is added, followed by a solution of sodium sulfite (54 g.) and potassium hydrogen carbonate (54 g.) in water (560 ml.). The mixture is stirred for three hours and then further for one-half hour after addition of chloroform (500 ml.). The organic layer is separated from the filtered reaction mixture and combined with the chloroform extracts (3×250 ml.) of the aqueous layer, the chloroform having been previously used in washing the filter cake. The combined chloroform is washed with water (500 ml.), dried over anhydrous magnesium sulfate and removal of solvent gives a greenish-yellow solid which is washed with a little methanol and dried. The solid which is recovered weighs 11 grams and melts at 209–215°. A specimen of this material crystallizes as prisms, melting point 211–215°, from chloroform-methanol. The same specimen melts at 215–220° after being dried overnight at the temperature of boiling xylene.

One gram of the product of the foregoing reaction, 16α,17α-dihydroxy-4,9(11)-pregnadiene-3,20-dione, is dissolved in acetone (25 ml.). Hydrochloric acid (three drops, d 1.19) is added to the solution which is then boiled gently for two minutes. After the reaction mixture is kept at room temperature for eighteen hours, the product is separated by addition of water (75 ml.) followed by ether extraction (3×50 ml.), the combined extracts being washed with aqueous sodium hydrogen carbonate solution (50 ml.), water (50 ml.) and then is dried over anhydrous sodium sulfate. The 16α,17α-isopropylidenedioxy derivative recovered melts at 200–201°.

A solution of 25 ml. of 1 N sodium methoxide in 100 ml. of anhydrous benzene is distilled until 75 ml. of distillate is collected. The residual mixture is allowed to cool to room temperature, diluted with 40 ml. of benzene and is treated with 6.00 g. (0.041 mole, 5.54 ml.) of ethyl oxalate during which time the mixture is stirred magnetically. The solid immediately dissolves and 9.30 g. (0.024 mole) of 16α,17α-isopropylidenedioxy-4,9(11)-pregnadiene-3,20-dione, the product of the previous reaction, is added. The solution becomes darker; and after one hour solid begins to precipitate from the solution. The mixture is stirred at room temperature for twenty-one hours. One hundred milliliters of ether is added, and the mixture is stirred for one hour. An additional 200 ml. of ether is added, and stirring is continued for three hours. The mixture is filtered to give 6.74 g. of crude sodium salt of 2-ethoxyoxalyl-16α,17α-isopropylidenedioxy-4,9(11)-pregnadiene-3,20-dione. The filtrate is evaporated to a syrup which is triturated with 100 ml. of ether. Filtration gives an additional 2.735 g. of the crude sodium salt.

The above batches of crude sodium salt are combined and dissolved in 400 ml. of water. The turbid solution is filtered, and the filtrate is acidified with 5% hydrochloric acid solution. The precipitate is collected by filtration and dried over phosphorus pentoxide to give 7.919 g. of pale yellow amorphous solid.

A solution of 3.20 g. (0.0326 mole) of potassium acetate in 100 ml. of methanol is chilled in an ice-bath during magnetic stirring. The product, [7.917 g. (0.0163 mole)], described in the previous paragraph, 2-ethoxyoxalyl-16α,17α-isopropylidenedioxy-4,9(11)-pregnadiene-3,20-dione is added to the potassium acetate solution using 20 ml. of methanol to aid in the transfer. A 19.8 ml. aliquot of a solution prepared by diluting 6.60 g. of bromine to 50 ml. volume with carbon tetrachloride is added dropwise over 50 minutes (the aliquot being equivalent to 0.0163 mole). The resulting turbid yellow solution is treated with 100 mg. of phenol and 16.3 ml. of 1 N sodium methoxide in methanol. The solution is allowed to reflux during ten minutes on a steam bath and then is chilled in an ice-bath. The crystals are collected by filtration; yield: 4.732 g. of pale yellow solid melting at 175–179° (dec.). An additional 2.420 g. of crystals melting at 179–183° (dec.) is recovered from the mother liquor. The material can be used for subsequent work without further purification.

A sample (0.500 g.) of the material described in the foregoing paragraph is dissolved in 7 ml. of benzene and chromatographed on 15 g. of silica gel (column size: 16 x 140 mm.). The column is washed with 100 ml. of benzene and the washings discarded. The column is then washed with 250 ml. of a solution of three parts ether and 97 parts benzene. Fifty milliliter percolates are collected and percolates 2, 3 and 4 are combined and concentrated to dryness under reduced pressure. The residue is dissolved in methanol and recrystallized giving 0.303 g. of glistening white plates melting at 177–179° (dec.). When this material is dried under reduced pressure at 56° for two hours, it becomes colored. Consequently, the analytical sample is dried at room temperature.

A solution of 7.243 g. (0.0156 mole) of the product described in the previous paragraph in 15 ml. of 2,4,6-collidine is refluxed for 45 minutes. A solid begins precipitating from the solution almost immediately and the mixture becomes dark. The cooled mixture is diluted with sufficient ether to make the total volume 80 ml. Filtration gives crude 2,4,6-collidine hydrobromine which is washed with 100 ml. of ether. The washing and filtrate are combined, and the resulting solution is washed first with 10% sulfuric acid and then with water. The washes are combined and extracted with 100 ml. of ether. The ether solutions are then combined and dried over a mixture of activated charcoal and anhydrous magnesium sulfate. The mixture is filtered and concentrated to dryness, giving 3.231 g. of needles melting at 196.0–198.5°. A sample is recrystallized three times from acetone-petroleum ether to give purified 16α,17α-isopropylidenedioxy-1,4,9(11)-pregnatriene-3,20-dione in the form of fine white needles melting at 204.5–205.5°.

A solution of 2.179 g. (5.7 mol.) of 16α,17α-isopropylidenedioxy-1,4,9(11)-pregnatriene-3,20-dione in 62 ml. of peroxide-free dioxane and 12 ml. of water is chilled to 15°. The solution is treated with 10.7 ml. of 20% perchloric acid solution and 0.980 g. (7.1 moles) of N-bromoacetamide. The solution is then allowed to stand at room temperature for thirty minutes, treated with 25 ml. of saturated sodium sulfite solution, and diluted with sufficient water to make the total volume 250 ml. This mixture is extracted three times with 150 ml. each time of methylene chloride. The three extracts are dried over magnesium sulfate and concentrated to about 15 ml. in volume. The solid which separates is collected by filtration and washed with 10 ml. of methanol to give 1.585 g. of crystals melting at 218–221° (dec.) (after darkening from 195°). The mother liquor gives an additional 0.25 g. of product. The product is recrystallized from acetone to give white crystals melting at 219.0–220.5° (dec.), (after darkening from 195°); $[\alpha]_D^{25} + 115°$ (chloroform); ultraviolet spectrum:

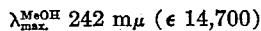

$\lambda_{max.}^{MeOH}$ 242 m$\mu$ ($\epsilon$ 14,700)

EXAMPLE 7

*Preparation of 9α-fluoro-11β-hydroxy-16α,17α-isopropylidenedioxy-1,4-pregnadiene-3,20-dione*

A solution of 1.20 g. (2.5 mols) of the product of Example 6, 9α-bromo-11β-hydroxy-16α,17α-isopropylidenedioxy-1,4-pregnadiene-3,20-dione and 1.20 g. of anhydrous potassium acetate in 180 ml. of ethanol is refluxed for sixteen hours. The solution is concentrated to near dryness, and the moist residue is triturated with 50 ml. of water. The mixture is filtered to give 0.947 g. of near white solid melting at 238–242°.

A solution of 0.636 g. (1.60 mols) of the product of the previous paragraph, 9β,11β-epoxy-16α,17α-isopropylidenedioxy-1,4-pregnadiene-3,20-dione in 6 ml. of methylene chloride and 10 ml. of tetrahydrofuran is chilled to —30° while in a stainless steel bomb. To this solution there is added a solution of five ml. of hydrogen fluoride in 5 ml. of methylene chloride, the solution having been chilled to —30°. The bomb is sealed and shaken at 5° for eighteen hours. The contents of the bomb are poured into 100 ml. of saturated sodium bicarbonate solution contained in a stainless steel beaker, the bomb is rinsed with 60 ml. of chloroform twice, and the rinsings are combined with the above mixture. The organic layer of the two-phase system is separated and washed twice with 50 ml. each time of saturated sodium chloride solution. The washed solution is concentrated to dryness under vacuum, and the moist residue is triturated with 7 ml. of acetone. The mixture is filtered to give 0.488 g. of a solid melting at 294–296° (dec.). The material is recrystallized from acetone-petroleum ether to give shiny white platelets melting at 294–296° (dec.); $[\alpha]_D^{25} + 102°$ (chloroform); ultraviolet spectrum:

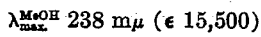

$\lambda_{max.}^{MeOH}$ 238 m$\mu$ ($\epsilon$ 15,500)

EXAMPLE 8

*Preparation of 9α-chloro-11β-hydroxy-16α,17α-isopropylidenedioxy-1,4-pregnadiene-3,20-dione*

To a solution of 0.400 g. (1.0 mol.) of 9β,11β-epoxy-16α,17α-isopropylidenedioxy-1,4-pregnadiene-3,20 - dione in 20 ml. of chloroform there is added 10 ml. of chloroform which has been saturated with hydrogen chloride at 5°. The resulting solution is allowed to stand at 0° for four hours, after which the solution is concentrated to dryness under reduced pressure at 25–30°. The solid residue is triturated with 10 ml. of acetone and then filtered to give 0.386 g. of white solid. This solid is recrystallized from β-methoxyethanol to give 0.375 g. of 9α-chloro-11β-hydroxy-16α,17α-isopropylidenedioxy - 1,4-pregnadiene-3,20-dione in the form of white crystals melting at 288–290° (dec.), after darkening from 255°; $[\alpha]_D^{25} + 125°$ (chloroform); ultraviolet spectrum:

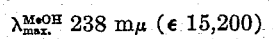

$\lambda_{max.}^{MeOH}$ 238 m$\mu$ ($\epsilon$ 15,200)

EXAMPLE 9

*Preparation of 9α-fluoro-16α,17α-isopropylidenedioxy-1,4-pregnadiene-3,11,20-trione*

A solution of 0.418 g. of the product of Example 7, 9α-fluoro-11β-hydroxy-16α,17α-isopropylidenedioxy - 1,4-pregnadiene-3,20-dione, in 5 ml. of pyridine is added to an ice-chilled slurry of 300 mg. of chromic anhydride in 4 ml. of pyridine. After standing at 22–25° for twenty hours, the solution is poured into ice-water to give a solid which is collected by filtration and washed thoroughly with water. The washed solid is dissolved in methylene chloride, and the resulting solution is washed thoroughly with saturated aqueous sodium chloride solution and dried over anhydrous magnesium sulfate. The solvent is removed by evaporation, yielding crystals of 9α-fluoro-16α,17α-isopropylidenedioxy - 1,4 - pregnadiene-3,11,20-trione; ultraviolet spectrum:

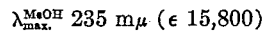

$\lambda_{max.}^{MeOH}$ 235 m$\mu$ ($\epsilon$ 15,800)

EXAMPLE 10

*Preparation of 11β,21-dihydroxy-16α,17α-isopropylidenedioxy-1,4-pregnadiene-3,20-dione*

A solution of 11β,16α,17α,21-tetrahydroxy-1,4-pregnadiene-3,20-dione (40 mg.) in acetone (10 ml.) containing hydrochloric acid (three drops; d 1.19) is boiled on the steam bath for two minutes and then allowed to stand for eighteen hours at room temperature. The reaction mixture is diluted with water (50 ml.) and extracted with chloroform (3×25 ml.), the combined extracts then being washed with water (30 ml.) and dried over anhydrous sodium sulfate. The residue obtained by removal of solvent crystallized from ethyl acetate-petroleum ether as small plates (25 mg.), melting point 257–260°.

EXAMPLE 11

*Preparation of 21-hydroxy-16α,17α-isopropylidenedioxy-1,4-pregnadiene-3,11,20-trione*

16α,17α,21-trihydroxy-1,4-pregnadiene - 3,11,20 - trione (one part), dissolved or suspended in acetone (60 parts), is treated with perchloric acid (two drops; 72%), and the mixture is stirred for three hours at room temperature. The product which separates on pouring the mixture into water is filtered off, washed with water and dried.

EXAMPLE 12

*Preparation of 9α-fluoro-11β,21-dihydroxy - 16α,17 - isopropylidenedioxy-1,4-pregnadiene-3,20-dione*

A solution of 250 mg. of 9α-fluoro-11β,16α,17α,21-tetrahydroxy-1,4-pregnadiene-3,20-dione in 70 ml. of hot acetone and 7 drops of concentrated hydrochloric acid is treated and worked up in the same manner as in the preparation of 9α-fluoro-11β,21-dihydroxy-16α,17α-isopropylidenedioxy-4-pregnene-3,20-dione as in Example 5. The residue is crystallized from acetone-petroleum ether to afford 166 mg. of the acetonide, melting point 270–274° (dec.) (with previous softening and browning). Three recrystallizations from acetone-petroleum ether gives 113 mg. of 9α-fluoro-11β,21-dihydroxy-16α,17α-isopropylidenedioxy-1,4 - pregnadiene - 3,20 - dione, melting point 274–279° (dec.) (with previous softening and browning); $[\alpha]_D^{25} + 112°$ (acetone); ultraviolet spectrum:

$$\lambda_{max}^{Abs.\ Alc.}\ 238\text{–}239\ m\mu\ (\epsilon\ 14{,}600)$$

EXAMPLE 13

*Preparation of 21-acetoxy-9α-fluoro-11β-hydroxy-16α,17α-isopropylidenedioxy-1,4-pregnadiene-3,20-dione*

A solution of 9α-fluoro-11β,21-dihydroxy-16α,17α-isopropylidenedioxy-1,4-pregnadiene-3,20-dione (690 mg.) in 5 ml. of pyridine is treated with 2.5 ml. of acetic anhydride and kept at room temperature overnight. The product melts at 257–262.5°.

EXAMPLE 14

*Preparation of 9α-fluoro-11β,21-dihydroxy-16α,17α-isobutylidenedioxy-1,4-pregnadiene-3,20-dione*

A suspension of 200 mg. of 9α-fluoro-11β,16α,17α,21-tetrahydroxy-1,4-pregnadiene-3,20-dione in 20 ml. of ethyl methyl ketone containing two drops of concentrated hydrochloric acid is heated on the steam bath for three minutes. It is then stirred at room temperature for seventeen hours, after which time solution is complete. After the addition of a small amount of water, the solution is neutralized with saturated sodium bicarbonate solution and evaporated under reduced pressure to an oil. Water and ethyl acetate are added and after separation and extraction of the water phase several times with ethyl acetate, the combined extracts are washed with saturated sodium bicarbonate solution and then with saline. The extract is dried over anhydrous magnesium sulfate and evaporated to a glass which is crystallized from acetone-petroleum ether to yield the product of this example.

EXAMPLE 15

*Preparation of 21-acetoxy-9-α-fluoro-16α,17α-isopropylidenedioxy-1,4-pregnadiene-3,11,20-trione*

A cold solution of 21-acetoxy-9α-fluoro-11β-hydroxy-16α,17α - isopropylidenedioxy - 1,4 - pregnadiene - 3,20-dione (200 mg.) in pyridine (5 ml.) is added to a slurry of chromic anhydride (150 mg.) in pyridine (2 ml.) After standing at room temperature (26°) for 22 hours, the solution is poured into ice water and extracted with ethyl acetate. The extract is washed with saturated saline, dried over anhydrous magnesium sulfate, treated with activated charcoal, filtered and evaporated to dryness. The residue is crystallized from acetone-petroleum ether to afford the product of this example.

EXAMPLE 16

*Preparation of 9α-fluoro-11β,21-dihydroxy 16α,17α-isopropylidenedioxy-4,6-pregnadiene-3,20-dione*

9α - fluoro - 11β,16α,17α,21 - tetrahydroxy - 4,6 - pregnadiene-3,20-dione (one part), dissolved or suspended in acetone (60 parts), is treated with perchloric acid (two drops; 72%), and the mixture is stirred for three hours at room temperature. The product which separates on pouring the mixture into water is filtered off, washed with water and dried.

EXAMPLE 17

*Preparation of 9α-fluoro-11β,21-dihydroxy 16α,17α-isopropylidenedioxy-1,4,6-pregnatriene-3,20-dione*

9α - fluoro - 11β,16α,17α,21 - tetrahydroxy - 1,4,6 - pregnatriene-3,20-dione (one part), dissolved or suspended in acetone (60 parts), is treated with perchloric acid (two drops; 72%), and the mixture is stirred for three hours at room temperature. The product which separates on pouring the mixture into water is filtered off, washed with water and dried.

EXAMPLE 18

*Preparation of 11β-acetoxy-9α-fluoro-21-hydroxy-16α,17α-isopropylidenedioxy-1,4-pregnadiene-3,20-dione*

A 155 mg. portion of 11β,16α,21-triacetoxy-9α-fluoro-17α-hydroxy-1,4-pregnadiene-3,20-dione is dissolved in 2.5 ml. of methyl alcohol. The system is evacuated and put under a nitrogen atmosphere. Over a ten-minute period, 0.47 ml. of potassium carbonate solution (10% w./v.) is added dropwise. Then 3.9 ml. of sodium chloride solution (12.5% w./v.) is added to the hydrolyzed solution. The mixture is allowed to stand for two hours at 0°. The crystals which formed are filtered, washed with water and dried under reduced pressure at 40° to produce 95.0 mg. of 11β - acetoxy - 9α - fluoro - 16α,17α,21 - trihydroxy-1,4-pregnadiene-3,20-dione. Recrystallization from methyl alcohol-isopropanol yields 55.9 mg. of a pure product having a melting point of 228–230°.

Then 33 mg. of the above product is dissolved in 16 ml. of acetone, and 0.05 ml. of concentrated hydrochloric acid is added. The solution is allowed to react at room temperature overnight. At the termination of this period, 2 ml. of a saturated solution of sodium bicarbonate and 5 ml. of water are added to the reaction mixture. The solution is concentrated to approximately 7 ml. under reduced pressure. The product is 11β-acetoxy-9α-fluoro-21-hydroxy - 16α,17α - isopropylidene - dioxy - 1,4 - pregnadiene-3,20-dione.

EXAMPLE 19

*Preparation of 11β,21-diacetoxy-9α-fluoro-16α,17α-isopropylidenedioxy-1,4-pregnadiene-3,20-dione*

The 19 mg. of 11β-acetoxy-9α-fluoro-21-hydroxy-16α,17α - isopropylidenedioxy - 1,4 - pregnadiene - 3,20 - dione obtained in Example 18 is dissolved in 0.3 ml. of pyridine; then 0.01 ml. of acetic anhydride is added. The solution is reacted at room temperature for eight hours. At that time, 0.03 ml. of methyl alcohol is added. The solution is evaporated to a residue. Crystallization from methyl alcohol-water yields 11β,21-diacetoxy-9α-fluoro-16α,17α-isopropylidenedioxy-1,4-pregnadiene-3,20-dione which melts at 227–232°; $[\alpha]_D^{25} = +138°$ (methyl alcohol); ultraviolet spectrum:

$$\lambda_{max}^{Abs.\ Alc.}\ 236\ m\mu\ (\epsilon\ 15{,}300)$$

EXAMPLE 20

*Preparation of 11β,21-dihydroxy-16α,17α-isopropylidenedioxy-6α-methyl-4-pregnene-3,20-dione*

(A) To a solution of 270 mg. of 21-acetoxy-16α,17α-isopropylidenedioxy - 11β,21 - dihydroxy - 6α - methyl - 4-pregnene-3,20-dione in 20 ml. of methanol under an atmosphere of nitrogen is added 0.32 ml. of 10% aqueous potassium carbonate. The reaction mixture is stirred at room temperature for 25 minutes, 0.11 ml. of glacial acetic acid is added; the solution is extracted with ethyl acetate and washed once with saturated saline. Treatment with magnesium sulfate anhydrous and activated carbon, filtration through diatomaceous earth and evaporation under reduced pressure gives, after filtration from ether, 110 mg. of white solid, melting point 228–229°. Crystallization from acetone-petroleum ether does not alter the melting point; $[\alpha]_D^{24} + 139°$ (chloroform); ultraviolet spectrum:

$$\lambda_{max}^{MeOH}\ 241\ m\mu\ (\epsilon\ 15{,}400)$$

To a suspension of 11β,16α,17α,21-tetrahydroxy-6α-methyl-4-pregnene-3,20-dione in acetone is added a drop of 72% perchloric acid. The solution is allowed to stand at room temperature for sixteen hours, after which it is neutralized with sodium bicarbonate, extracted with ethyl acetate, washed with saline, treated with magnesium sulfate anhydrous, filtered through diatomaceous earth and evaporated under reduced pressure to a white solid. Crystallization from acetone-petroleum ether gives a product identical with that of (A) above.

EXAMPLE 21

*Preparation of 21-acetoxy-16α,17α-isopropylidenedioxy-11β-hydroxy-6α-methyl-4-pregnene-3,20-dione*

To a solution of 16α,17α-isopropylidene-dioxy-11β,21-dihydroxy-6α-methyl-4-pregnene-3,20-dione in pyridine is added acetic anhydride, and the solution is allowed to stand at room temperature for eighteen hours. The solution is diluted with ethyl acetate, washed once with dilute hydrochloric acid, once with saturated sodium bicarbonate and finally with saturated saline to neutrality. Treatment with magnesium sulfate anhydrous and activated carbon, filtration through diatomaceous earth and evaporation under reduced pressure yields a solid which, after crystallization from acetone-petroleum ether, gives the 21-acetate, melting point 218–219°; $[\alpha]_D^{24}+131°$ (chloroform); ultraviolet spectrum:

$$\lambda_{max.}^{MeOH}\ 242\ m\mu\ (\epsilon\ 14{,}100)$$

EXAMPLE 22

*Preparation of 11β,21-dihydroxy-16α,17α-isopropylidenedioxy-6α-methyl-1,4-pregnadiene-3,20-dione*

To a suspension of 11β,16α,17α,21-tetrahydroxy-6α-methyl-1,4-pregnadiene-3,20-dione (200 mg.) in 15 ml. of acetone is added one drop of 72% perchloric acid. The resulting solution is allowed to stand at room temperature for sixteen hours, after which 1 ml. of saturated sodium bicarbonate is added. The mixture is concentrated under reduced pressure, extracted with chloroform, treated with anhydrous magnesium sulfate and activated charcoal, filtered through diatomaceous earth and evaporated under reduced pressure to a white solid, melting point 252–256°. A single crystallization from acetone-petroleum ether gives 95 mg., melting point 256–260°. Two further crystallizations from the same solvent gives a pure product, melting point 256–258°.

EXAMPLE 23

*Preparation of 9α-fluoro-11β,21-dihydroxy-16α,17α-isopropylidenedioxy-6α-methyl-1,4-pregnadiene-3,20-dione*

To a stirred suspension of one part 11β,16α,17α,21-tetrahydroxy-9α-fluoro-6α-methyl-1,4-pregnadiene-3,20-dione in 50 parts of acetone is added three drops of 72% perchloric acid. After three hours, the reaction is neutralized with aqueous sodium bicarbonate. The organic solvent is partially removed under reduced pressure, and the resultant crystals of 11β,21-dihydroxy-16α,17α-isopropylidenedioxy-9α-fluoro-6α-methyl-1,4-pregnadiene-3,20-dione are collected, washed with water and dried.

EXAMPLE 24

*Preparation of 11α-hydroxy-16α,17α-isopropylidenedioxy-4-pregnene-3,20-dione*

A solution of 10.0 g. (0.039 mole) of osmium tetroxide in 250 ml. of benzene is added dropwise to a solution of 12.00 g. (0.037 mole) of 11α-hydroxy-4,16-pregnadiene-3,20-dione in 240 ml. of benzene and 6 ml. of pyridine during continuous stirring. The solution becomes black, and a black solid separates from the solution before the addition is completed. The mixture is stirred for two hours. The mixture is treated with 380 ml. of methanol; this dissolves the black solid. A solution of 72 g. of potassium bicarbonate and 72 g. of sodium sulfite in 1200 ml. of water is added; within five minutes, a black solid separates from the solution. Additional benzene (500 ml.) and chloroform (500 ml.) are added; however, the dark material fails to dissolve. The mixture is stirred for nineteen hours; at no time does the separated material assume a red color. The mixture is filtered, and the organic layer is separated, washed with saturated saline and taken to dryness. The residue is crystallized from acetone-petroleum ether to give 1.576 g. of white crystals, melting point 213–215°; $[\alpha]_D^{25}+82.6°$ (chloroform); ultraviolet spectrum:

$$\lambda_{max.}^{MeOH}\ 241\ m\mu\ (\epsilon\ 14{,}600)$$

A solution of 0.75 g. of 11α,16α,17α-trihydroxy-4-pregnene-3,20-dione in 50 ml. of acetone and two drops of 37% hydrochloric acid solution is allowed to stand at room temperature for sixteen hours. The solution is filtered, and the filtrate is concentrated to about 20 ml. volume. Water (5 ml.) is slowly added, and long needles begin to separate. The mixture is chilled and filtered. The material is recrystallized from acetone-petroleum ether to give 0.7 g. of long needles, melting point 252–254°; $[\alpha]_D^{25}+117°$ (chloroform); ultraviolet spectrum:

$$\lambda_{max.}^{MeOH}\ 241\ m\mu\ (\epsilon\ 16{,}200)$$

A solution of 0.400 (1.0 mole) of 11α-hydroxy-16α,17α-isopropylidenedioxy-4-pregnene-3,20-dione and 0.75 ml. of methanesulfonyl chloride in 2.5 ml. of pyridine is allowed to stand at 5° during seventeen hours. The dark solution is diluted with 20 ml. of methylene chloride, washed with 20 ml. of 5% hydrochloric acid solution and with 20 ml. of water. The organic solution is dried over magnesium sulfate and evaporated. The residual gum is crystallized from acetone-petroleum ether to give 0.332 g. of crystals, melting point 165–167°. The material is recrystallized from acetone-petroleum ether to give white needles, melting point 171–172° (dec.); $[\alpha]_D^{25}+94°$ (chloroform); ultraviolet spectrum:

$$\lambda_{max.}^{MeOH}\ 238\ m\mu\ (\epsilon\ 17{,}100)$$

We claim:
1. The compound 9α-fluoro-11β,21-dihydroxy-16α,17α-isopropylidenedioxy-1,4,6-pregnatriene-3,20-dione.
2. The compound 11α-hydroxy-16α,17α-isopropylidenedioxy-4-pregnene-3,20-dione.

No references cited.